O. E. RUHOFF.
ELECTRIC BATTERY.
APPLICATION FILED APR. 28, 1919.
1,342,068.
Patented June 1, 1920.
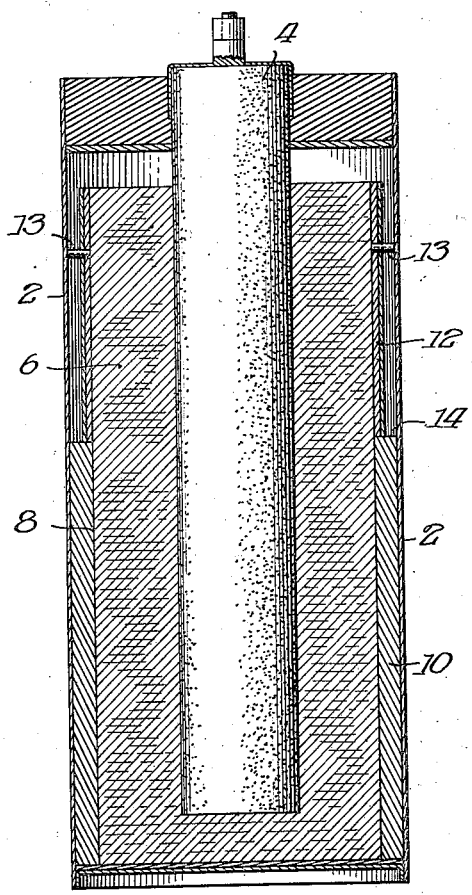
Inventor:
Otto E. Ruhoff,
By Cheever & Cox
Attys.

UNITED STATES PATENT OFFICE.

OTTO E. RUHOFF, OF MADISON, WISCONSIN, ASSIGNOR TO FRENCH BATTERY & CARBON CO., OF MADISON, WISCONSIN, A CORPORATION OF WISCONSIN.

ELECTRIC BATTERY.

1,342,068.   Specification of Letters Patent.   Patented June 1, 1920.

Application filed April 28, 1919. Serial No. 293,050.

*To all whom it may concern:*

Be it known that I, OTTO E. RUHOFF, a citizen of the United States, residing at Madison, in the county of Dane and State of Wisconsin, have invented a certain new and useful Improvement in Electric Batteries, of which the following is a specification.

This invention relates to dry batteries of the type used in operating ignition, and telephone equipment and flash lamps.

It is well understood in the battery art that when a battery is first put into service, it gives its maximum current and that when it is all worn out it gives its minimum current with intermediate currents during the life of the battery varying in intensity between the two.

The object of this invention is to provide a battery in which, as originally made, only a portion of the battery material is in use or commission; the construction of the battery and materials used being such that as the battery is used additional portions of the battery material are put into use, this being done gradually until all the battery material is used, the result being that throughout the life of the battery a more nearly uniform current is produced by it instead of the greatly varying current of the old art above referred to. The invention consists in a battery so constructed that when first made only the portion of the battery material in, say the lower portion of the cell, is used and that as the use of the cell progresses, the working materials move or spread upward in the cells thus reaching and consuming additional portions of the battery material until finally in the last stages of the battery what is left of the entire battery material is in use. The invention consists in means of accomplishing this result which can be easily and cheaply made which is satisfactory in use and does not readily get out of order. More particularly the invention consists in the features and details of construction hereafter more fully set forth in the specification and claims.

The single figure of the drawing shows a section of the battery illustrating this invention in its preferred form.

Conforming to modern practice, the cell is inclosed within the usual zinc can 2 forming one pole of the battery. Within this can is the central carbon rod 4 surrounded with a body of depolarizing material 6 of any of the well known varieties well understood in the art, the same being held in place by pasting with or without a bag 8 as is well understood in the art. The carbon and this depolarizing material together constitute the second pole of the battery. In assembling the battery, the lower portion of the interior of the cell is only partially filled with a gelatinous electrolyte 10, well known in the art. The portion of the core above this electrolyte 10 is surrounded by a body 12 of reserve electrolyte either in the form of a layer of gelatinous electrolyte material or a coating of bibulous paper soaked in electrolyte. Under either construction, reserve electrolyte 12 is so arranged and located that it does not contact with the zinc can 2. This may be insured by spacing insulators 13 if desired. When reserve gelatinous material without bibulous paper is used, it may be held in place by any suitable means such as a wrapping of string or a layer of light paper. The diameter of the core of depolarizing material may be made smaller where the reserve gelatinous material is applied; that is, below if this is found necessary in order to properly accommodate the reserve gelatinous material without contacting the can. It is well understood in the art that as an ordinary dry battery, made of the material heretofore set forth, discharges in the process of operation a substantial body of soft gelatinous material sometimes described in the trade as "goo" forms on the top of the electrolyte and fills up the top of the battery case, even breaking it open, when sufficient space for it has not been allowed. This property of the operation of the battery is taken advantage of in carrying out this invention. When the battery, as shown in the drawings as herein described, is put into operation only that portion of the battery materials below the top 14 of the electrolyte material 10 is in effective operation and the current delivered is in proportion to such quantity of battery material in use. As the battery operates, the gelatinous material or "goo" is formed, in the manner described, above the line 14 and forms a contact between adjacent portions of the reserve material 12 and zinc can 2 above line 14, thus throwing into use an additional portion of battery material measured in each instance by the top of the gelatinous material or "goo". This gelatinous material continues to form in increasing volume and travels up the interior of the case until all of the reserve material 12 is finally put into commission whereupon the battery operates until it exhausts itself in the ordinary manner.

An additional advantage of this invention is that so much space does not have to be left for the gelatinous material or "goo" in the top of the can as in batteries of ordinary construction with the result that more materials may be initially inserted and consequently a battery of greater life and efficiency may be obtained within a given volume of structure.

It is, of course, understood that the battery should be equipped with the usual insulating seal at the bottom of the can 2 and, that the top is provided with a suitable seal 16, all well understood in the art and not entering into the details of this invention.

Having thus described my invention what I claim as new and desire to secure by Letters Patent, is:—

1. An electric battery comprising the usual zinc can and inner carbon pole; an initial portion of electrolyte adapted to initially act between the zinc and carbon pole and a reserve portion of electrolyte adapted to be gradually thrown into use by the products produced by the operation of said initial portion of electrolyte.

2. In an initially operative electric battery in combination with a zinc can, a carbon rod and depolarizing material therein, an electrolyte extending part way up the zinc and carbon and depolarizing material, and a reserve portion of electrolyte secured about the carbon and depolarizing material but clear of the zinc for the purposes set forth.

3. In an electric battery in combination with an outer zinc can, an inner carbon rod surrounded by depolarizing material and an initially operative gelatinous electrolyte occupying the lower portion of the can and in contact with the depolarizing material and a wrapping of gelatinous electrolyte about the depolarizing material above said first mentioned portion of electrolyte and clear of the zinc of the can for the purposes set forth.

In witness whereof, I have hereunto subscribed my name in the presence of two witnesses.

OTTO E. RUHOFF.

Witnesses:
 DWIGHT B. CHEEVER,
 ANNA ROSENTHAL.